US005096502A

United States Patent [19]

Carter et al.

[11] Patent Number: 5,096,502

[45] Date of Patent: Mar. 17, 1992

[54] ADVANCED WATER LANCE CONTROL SYSTEM BASED ON PEAK FURNACE WALL EMISSIVITY

[75] Inventors: Hudson R. Carter, Granville; Dean E. Draxton, Newark, both of Ohio

[73] Assignee: The Babcock & Wilcox Company, New Orleans, La.

[21] Appl. No.: 621,418

[22] Filed: Dec. 3, 1990

[51] Int. Cl.[5] .......... B08B 7/04; B08B 9/00; C21B 7/24; G01J 1/14

[52] U.S. Cl. .......... 134/18; 134/22.1; 134/113; 250/330; 250/342; 266/81; 266/90; 266/91

[58] Field of Search .......... 134/1, 18, 34, 37, 113, 134/22.1; 266/81, 90, 91; 250/330, 342

[56] References Cited

U.S. PATENT DOCUMENTS

| | | | |
|---|---|---|---|
| 2,013,511 | 9/1935 | Steinbacher | 134/22.1 |
| 3,782,336 | 4/1974 | Nelson | 122/379 |
| 4,209,028 | 5/1980 | Shenker | 134/56 R |
| 4,644,173 | 11/1987 | Jeffers | 250/554 |
| 4,690,634 | 10/1987 | Herngren et al. | 431/8 |
| 4,884,896 | 12/1989 | Conway | 250/342 |

OTHER PUBLICATIONS

Water Cleaning Performance Evaluations, Nebraska Public Power District, Gerald Gentleman Station, Final Report, Nov. 12, 1990.

"Flame Quality Analyzer for Temperature Measurement and Combustion Control", SENSORS, vol. 5, Jan. 1988.

On-Line Imaging and Emissivity Measurements to Determine Furnace Cleanliness, H. R. Carter and C. G. Keksal, draft copy of paper to be presented in Oct. 1991.

Cost and Quality of Steam Coal Deliveries, Producing State/Consuming State", Power Plant Deliveries, Data for Feb. 1991", from National Coal Association, May, 1991 issue.

"Reflectivity/Emissivity Character of Western Fuel", Clark, Gregory A., Alliance Research Center 1990, Western Fuels Conference, Sep. 11, 1990, Minneapolis, MN.

"Measurement of Radiative Properties of Ash and Slag by FT-IR Emission and Reflection Spectroscopy", Solomon, Peter, et al., submitted to Journal Heat Transfer 1991.

"Monitoring of Recovery Boiler Interiors Using Imaging Technology", Anderson, Marc. J., et al., CPPA--TAPPI 1989 International Chemical Recovery Conference.

Promotional Brochure Advertisement.

"Flame Quality Analyzer for Temperature Measurement and Combustion Control", R. T. Bailey and H. R. Carter.

*Primary Examiner*—Theodore Morris
*Assistant Examiner*—Saeed Chandhry
*Attorney, Agent, or Firm*—Vytas R. Matas; Robert J. Edwards; Daniel S. Kalka

[57] ABSTRACT

A method and apparatus for controlling the operation of a water lance for water cleaning a furnace wall comprises a sensor or calculation equipment to derive the furnace wall emissivity and equipment that compares the emissivity to a programmed low setpoint that represents an unclean furnace wall and poor furnace operation. Water lance operation is initiated when the low setpoint is reached. The speed at which the water lance operates is also adjusted according to peak emissivity levels which are measured or derived from the furnace walls after each cleaning.

20 Claims, 8 Drawing Sheets

NOTE 1:CONTROL MODES ARE: AUTO OPERATE WITH PROGRAMMED SETPOINT, AUTO OPERATE WITH AUTO SETPOINT ADJUST, SEQUENCE START (STARTED BY OPERATOR), TOD START, AND CYCLE START

ADVANCED WATER LANCE CONTROL SYSTEM BASED ON PEAK FURNACE WALL EMISSIVITY

FIELD AND BACKGROUND OF THE INVENTION

The present invention relates in general to the cleaning of furnace walls, and in particular to a new and useful method of controlling one or more water, steam, air, or combination thereof cleaning devices, for cleaning particularly reflective and tenacious ash from the furnace walls.

While the technique of soot blowing, using air or steam, for cleaning ash from the walls of a furnace are known, these measures are not effective against the type of white tenacious ash which coats the walls of a furnace when burning certain Western fuels such as Powder River Basin coals. The use of water lances may be necessary to remove this type of deposit, so as to return good heat exchange efficiency to the walls of the furnace.

A variety of sensors or monitors are known which can be utilized to sense and measure near infrared emissions, such as those which represent heat within a furnace or other heated process enclosure. See for example, U.S. Pat. Nos. 4,539,588 and 4,690,634.

SUMMARY OF THE INVENTION

The present invention comprises an advanced water lance control system and technique which monitors, calculates or otherwise derives furnace wall emissivity, and utilizes the derived emissivity in combination with programmed setpoints to initiate, control and terminate water lance (WL) operations.

Accordingly, an object of the present invention is to provide a method for controlling the operation of a water lance for cleaning a furnace wall having a changing emissivity, comprising: deriving the furnace wall emissivity; comparing the derived emissivity with a programmed low setpoint for minimum emissivity of the furnace wall; and initiating water lance operation when the derived emissivity drops below the programmed low setpoint, to clean the furnace wall.

A further object of the present invention is to provide a mechanism for varying the speed of operation for the water lance and for taking into account other furnace parameters for controlling the water lance cleaning operation.

DESCRIPTION OF THE PREFERRED EMBODIMENTS

The present invention automatically controls one or more water lances for water cleaning of the furnace walls. With this control scheme, automatic water lance (WL) operation and control is based on furnace wall emissivity. An alternate embodiment utilizes an infrared camera to measure wall reflectivity or temperature. Furnace wall emissivity is measured and/or calculated using the visible spectrum intensities of the furnace wall and flame. Equivalent emissivity of the furnace wall can also be derived from infrared thermogram(s) of the furnace wall. Many other methods of determining furnace wall emissivity can also be utilized for the control scheme of the invention.

Regardless of the emissivity measurement or derivation method employed, automatic initiation of WL operation is based on comparing the emissivity of the furnace wall to programmed setpoints. When the wall emissivity drops below the programmed setpoints, WL operation is initiated. In the case of multiple WLs operating in a sequence, an additional setpoint can be utilized to automatically terminate WL operation when the furnace wall emissivity reaches an acceptable value.

Figure 6:
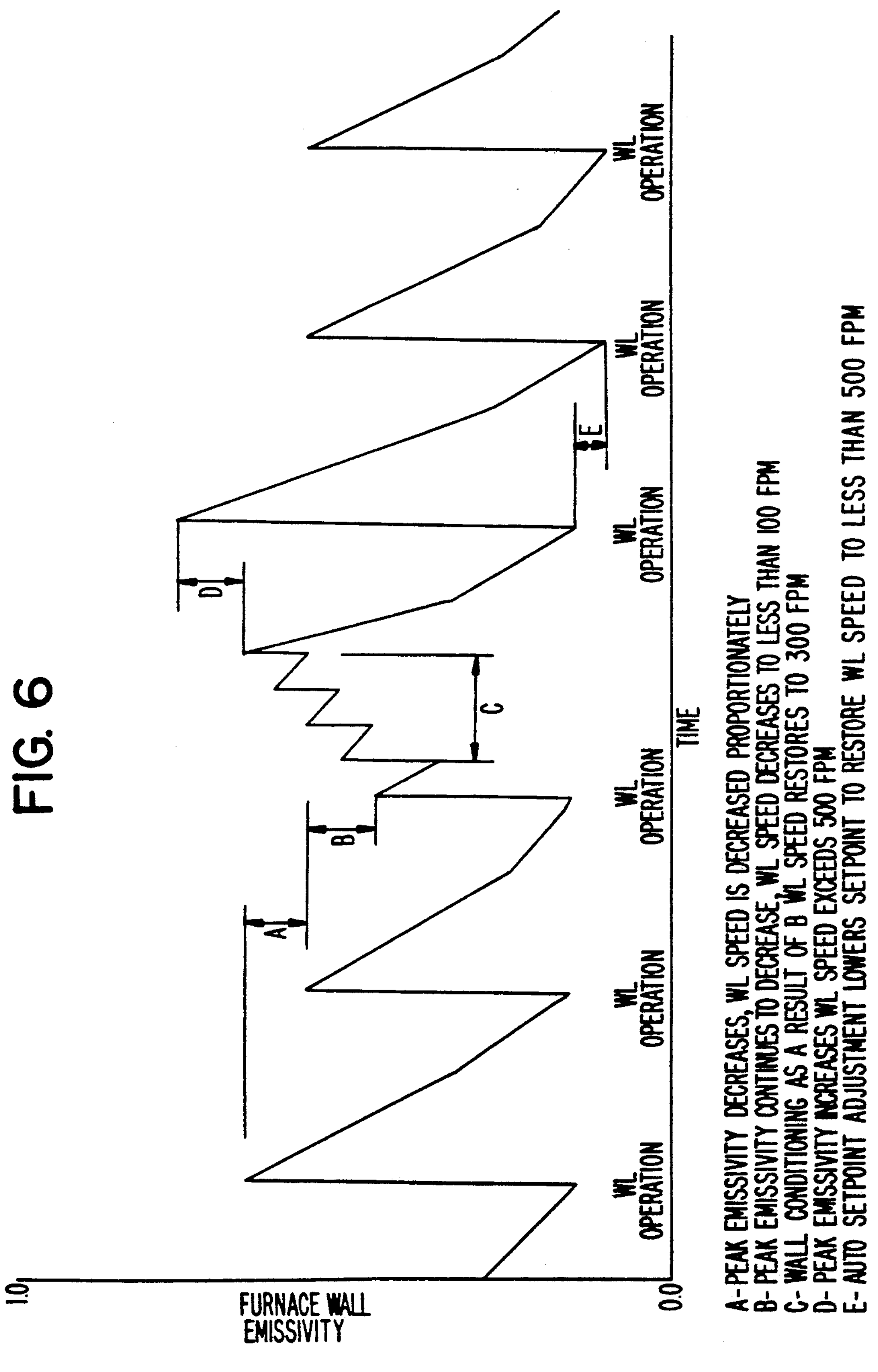
FIG. 6 is a graph plotting furnace wall emissivity against time to illustrate a typical trend for changes in furnace wall emissivity.
Figure 9:
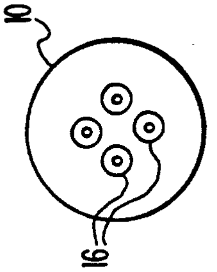
FIG. 9 is an elevation taken along line 9—9 of FIG. 7.

During automatic WL operation, the wall emissivity rapidly reaches a peak after each WL operation, then slowly decays over time to a lower asymptotic state. Additional WL operations result in additional peaks in wall emissivity. Changes in WL effectiveness result in variations of the peak wall emissivity. A typical emissivity trend depicting these peaks and decays is shown in FIG. 6. As seen in FIG. 6, A depicts that as the peak emissivity decreases, the WL speed is decreased proportionately. B illustrates that as peak emissivity continues to decrease, WL speed decreases to less than 100 FPM. C shows the wall conditioning as a result of B, and WL speed restores to 300 FPM. D represents peak emissivity increases with WL speed exceeding 500 FPM. E shows that the auto setpoint adjustment lowers setpoint to restore WL speed to less than 500 FPM.

According to the inventive control scheme, WL usage is further optimized by using the peak wall emissivity of this trend to control WL speed, thus controlling the linear propagation of the water spray on the furnace wall. WL speed for each subsequent WL operation is based on the algebraic difference between the previous peak wall emissivity and the present peak wall emissivity. As peak wall emissivity decreases, WL speed is decreased proportionately, resulting in a longer water spray dwell time on the furnace wall, thus increasing WL cleaning effectiveness. Similarly, as peak wall emissivity increases, WL speed is increased proportionately, resulting in a shorter water spray dwell time, reducing unnecessary thermal shock to the furnace wall.

In the course of automatic WL operation with automatic speed control, if and/or whenever WL speed falls below a predetermined limit (100 FPM), automatic operation with automatic speed control is terminated and wall conditioning is initiated to increase peak wall emissivity response. Wall conditioning consists of multiple consecutive WL operations (up to 5) at normal (300 FPM) speed. See C in FIG. 6.

Automatic WL speed computation based on wall emissivity is continued during wall conditioning. If and/or when the computed automatic WL speed returns to normal (300 FPM), wall conditioning is terminated and automatic WL operation with automatic speed control is resumed. If, in the course of wall conditioning, the computed automatic WL speed fails to recover to normal speed (300 FPM), WL control reverts to the normal sequence start mode, and the lack of wall conditioning response is alarmed to the operator.

An additional automatic control .feature, automatic setpoint adjustment, provides the necessary regulation to limit maximum automatic WL speed (500 FPM). If and/or whenever the computed automatic WL speed exceeds this maximum, the WL speed is set to the maximum limit and a new (lower) automatic WL operation setpoint is computed based on the increased in peak wall emissivity. This effectively reduces automatic WL operation frequency to match the maximum WL speed while maintaining satisfactory furnace wall cleaning Automatic adjustment of the WL operation setpoint is further limited to a minimum (0.15) to ensure proper automatic WL control based on furnace wall emissivity.

The control scheme of the invention is shown on the flow charts of FIGS. 1 to 5, which are incorporated into a typical WL control system. The flow chart symbols are ANSI standard, based on IBM® DATA PROCESSING TECHNIQUES MANUAL, C20-8152. These flow charts specifically depict a program for a state-of-the-art microprocessor or computer based control system. However, the concepts shown may be implemented on any control system, with any variety of hardware.

Figure 1:
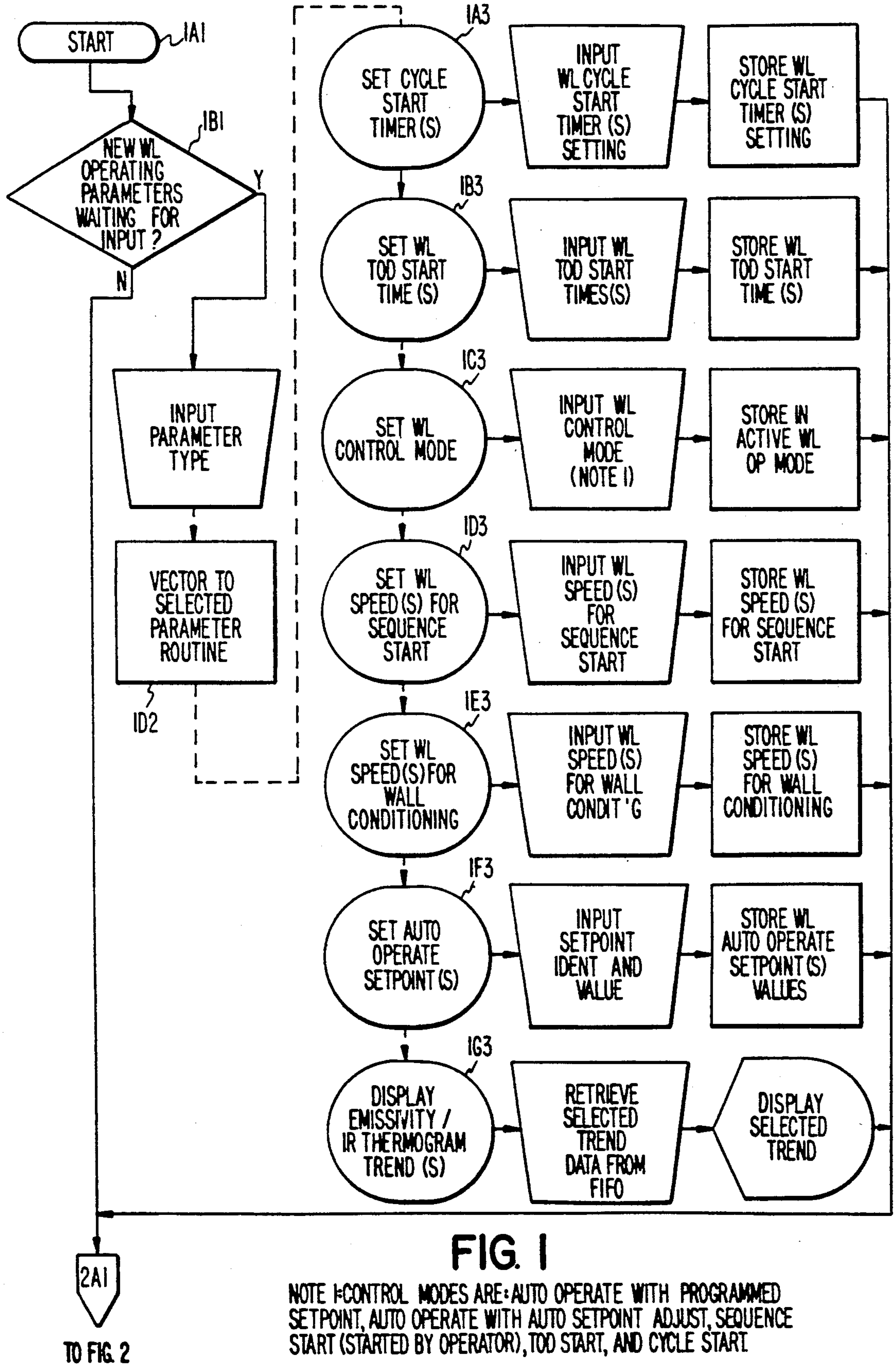
FIGS. 1-5 are flow charts showing the operation of the present invention.

The program starts on the flow chart of FIG. 1 at block 1A1, and enters the WL control loop by checking for newly changed WL control parameters (1B1). If a newly changed parameter is present, the program vectors (1D2) to the selected parameter routine in column 3 of FIG. 1 executes the necessary parameter changes, and exits to FIG. 2 block Al (2A1).

The parameter routines starting at blocks 1A3, 1B3 and 1C3 are typical for prior art WL control systems. The parameter routines starting at blocks 1D3, 1E3, 1F3 and 1G3 are part of the advanced WL control scheme of the invention. Blocks 1D3, 1E3 and 1F3 allow data input for WL speed control and the automatic operate setpoint(s). Block 1G3 provides selection of visual display trends of the furnace wall emissivity.

Figure 2:
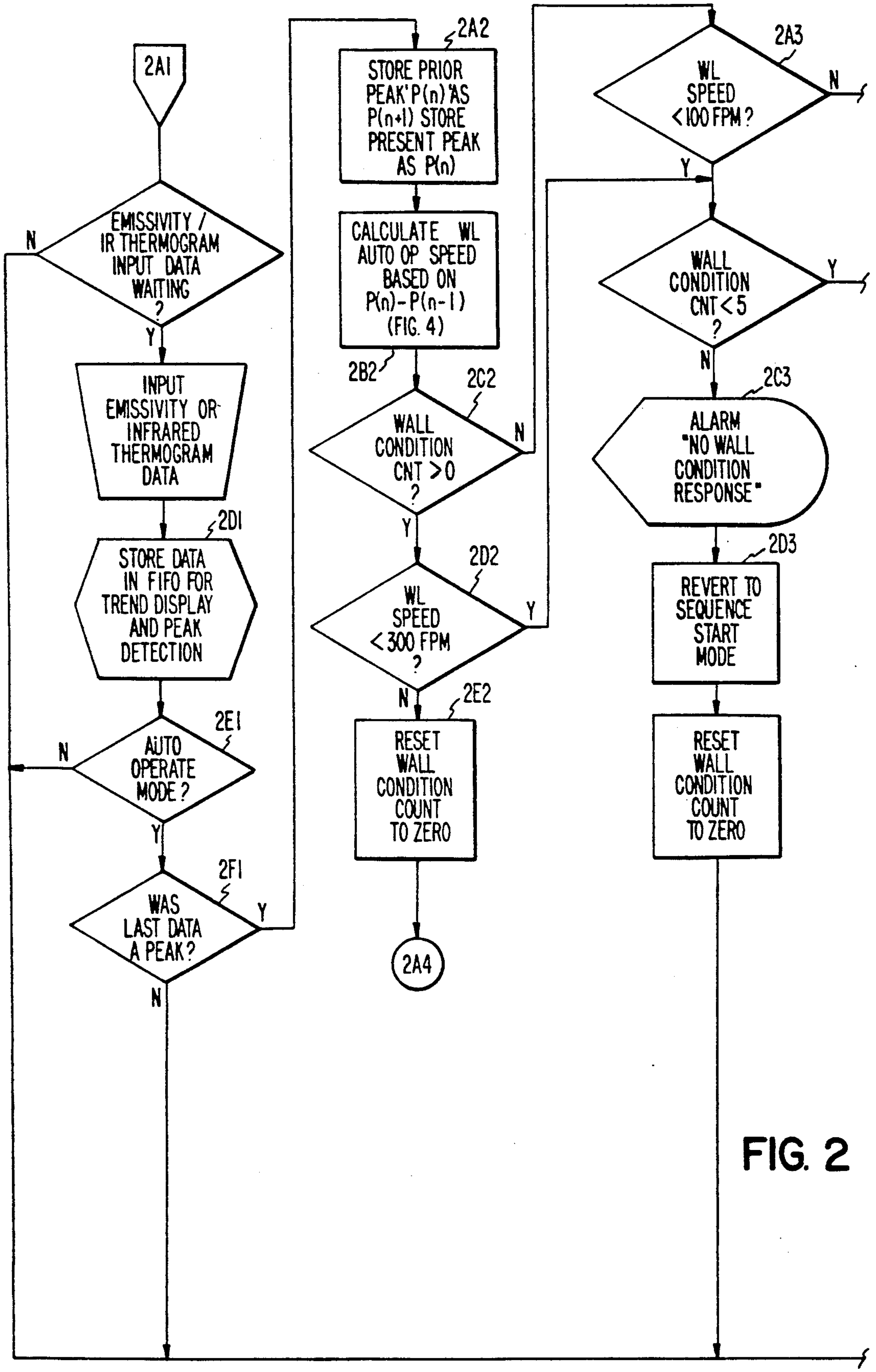
Figure 2:
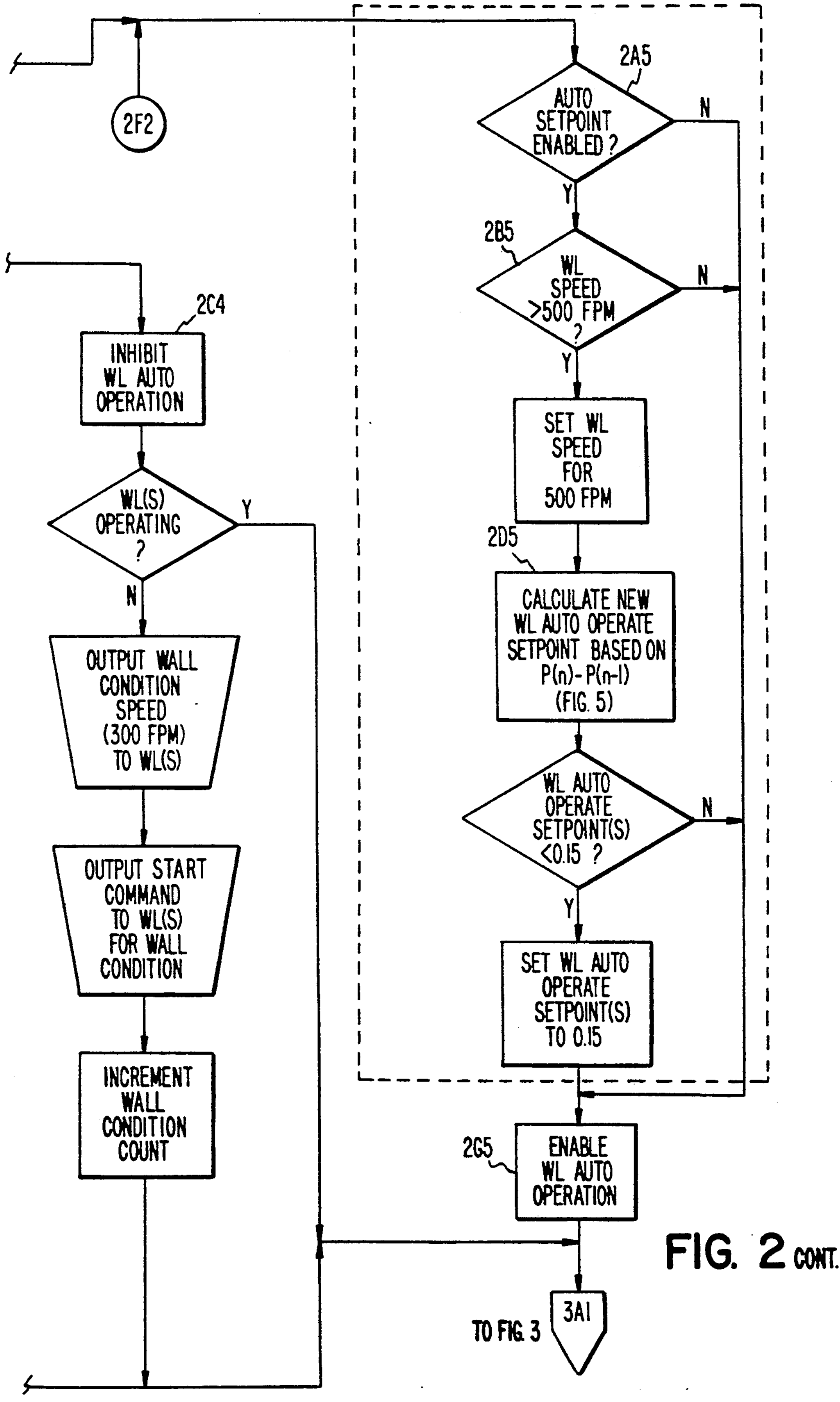

The flow chart at FIG. 2 depicts the body of the advanced WL control scheme. This portion of the control loop starts at block 2A1 by checking for new emissivity input data. When new data exists, it is stored in memory (2D1) for the visual trend display and also for peak determination.

After new emissivity data input, if the control system is in auto operate mode (2E1), the stored emissivity data is checked for a peak (2F1). When the new data results in a peak, then a new WL speed is calculated (2A2 & 2B2, FIG. 4) based on the new peak and the previous peak. If wall conditioning has previously been initiated (2D2), then the wall conditioning is either terminated (2E2) if the new WL speed is not less than 300 FPM (2D2), or continued if the new WL speed is less than 300 FPM.

If wall conditioning was not previously initiated (2C2) when the new WL speed is calculated, and the newly calculated WL speed is less than 100 FPM (2A3), then WL auto operation is inhibited (2C4) and wall conditioning is initiated for a maximum of 5 WL operations. If in the course of wall conditioning, the calculated WL speed does not recover to 300 FPM, then the control system alarms (2C3) and reverts to the sequence start mode (2D3).

If wall conditioning was not previously initiated (2C2), the newly calculated WL speed is not less than 100 FPM (2A3), and the auto setpoint adjustment has been enabled (2A5), then a new auto operate setpoint is calculated (2D5, FIG. 5) if the newly calculated WL speed is greater than 500 FPM (2B6).

If the auto setpoint adjustment has not been enabled, or if the newly calculated WL speed is not greater than 500 FPM, then the auto operate setpoint remains unchanged and WL auto operation is enabled (2G5). The program exits to FIG. 3 block 3A1.

Figure 3:
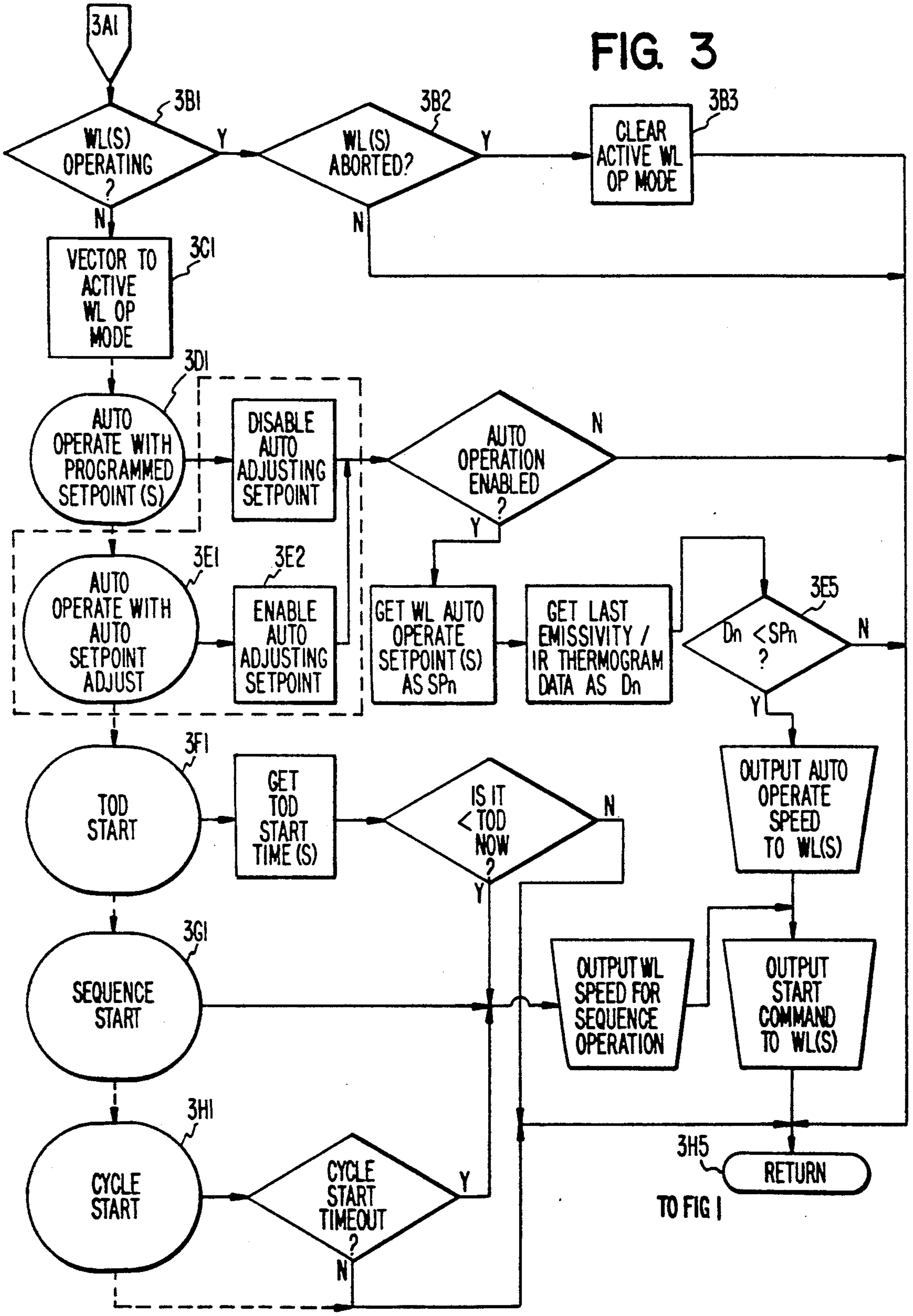

The flow chart of FIG. 3 depicts the portion of the program that, except for the wall conditioning operation, actually initiates the WL operation. This portion of the program is entered at block 3A1 by checking for WL operation. If the WLs are already in operation and have been terminated (3B2), then the active control mode is cleared (3B3), and WL control reverts to an inactive state as soon as all running WLs return to the retracted position.

If the WLs are not presently in operation, then the program vectors (3C1) to the active control mode (3D1, 3E1, 3F1, 3G1 or 3H1) as selected in block 2C3 on the flow chart of FIG. 2. If there is no control mode presently active, the program exits the control loop at block 3H5, and subsequently re-enters the control loop at block 1A1 on flow chart page 1.

The control modes starting at blocks 3F1, 3G1 and 3H1 are typical for prior art WL control systems. The control modes starting at blocks 3D1 and 3Fl are part of the advanced WL control scheme described here. The auto operate control mode (3D1) provides automatic initiation of WL operation based on furnace wall emissivity falling below a programmed setpoint (3E5). The auto operation/auto setpoint adjust control mode, in addition to automatic initiation of WL operation based on emissivity setpoint, also enables (3E2) the automatic setpoint adjustment depicted by blocks 2A5, 2B5, 2C5, 2D5, 2E5 and 2F5 on the flow chart of FIG. 2.

Figure 4:
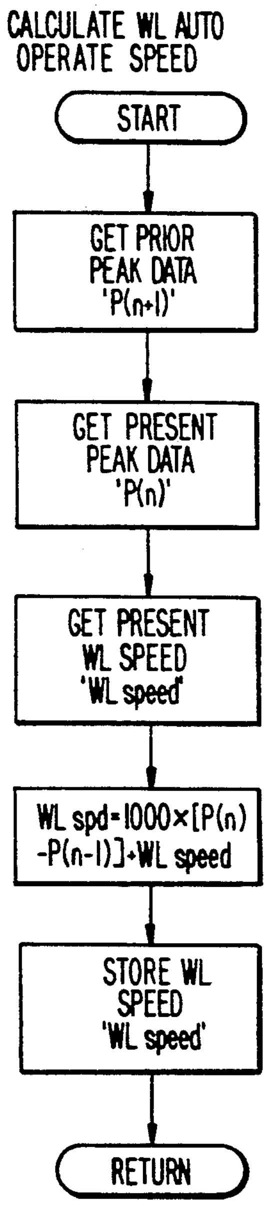
Figure 5:
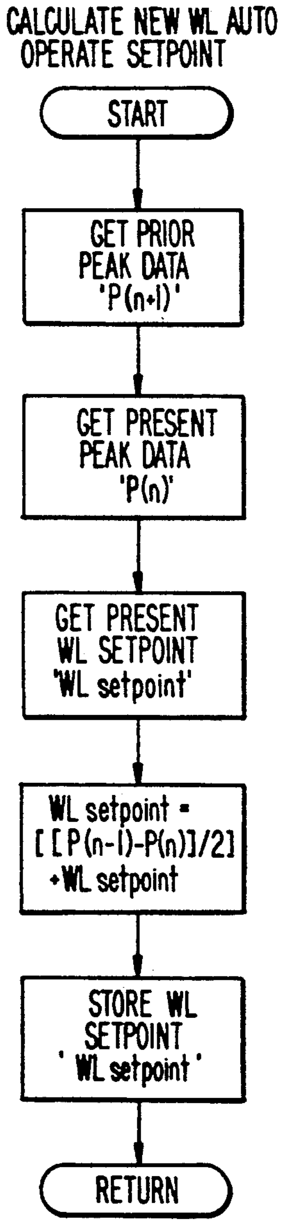

The flow charts of FIGS. 4 and 5 show in detail the subroutines for calculating WL auto operate speed (2B2) and WL auto operate setpoint adjustment (2D5) based on peak furnace wall emissivity. The WL auto operate speed subroutine is depicted in FIG. 4, and the WL auto setpoint adjustment subroutine is depicted in FIG. 5.

Testing work has been performed to verify the usefulness of direct measurements of wall emissivity as an indicator of furnace wall cleanliness. This measurement technique is applicable to boilers that are burning Western coals like Powder River Basin coal. Powder River Basin coal produces a thin reflective and very tenacious ash that cannot be removed with typical or conventional air or steam cleaning techniques.

In order to make the direct measurements of wall emissivity, it is necessary to measure incident intensity and the reflected intensity at the wall at a selected wavelength. For this application, the invention utilizes one or both of the sodium or potassium spectral lines, or all visible radiation. A sensing pro illustrated in FIG. 7 may be associated with each of the water lances used for cleaning the furnace wall. The probes are located in a web part of the furnace wall between tubes. A small diameter hole or slit is placed in the web material to provide access to the interior of the furnace. On a periodic basis, the probe is inserted into the furnace region to provide a concurrent measurement of both incident and reflected intensities at the selected wavelengths.

Fused silica fibers with aluminum cladding and/or with a patented (U.S. Pat. No. 4,893,895) sheath optical fiber may be used in the probe. The fused silica fiber provides the capability for operating up to temperatures of at least 800° F. and potentially to the melting point of the fused silica. An air purge is required more for keeping the ports clean than necessarily for cooling the probes.

The optical fibers provide the transmission for the incident reflective intensities. These intensities are measured by photodiode arrays (not shown) that are sensitive to the selected wavelengths.

Figure 7:
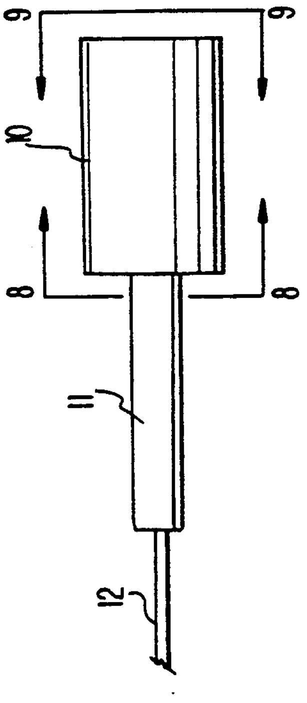
FIG. 7 is a side elevational view of a probe which can be used for measuring emissivity according to the present invention.
Figure 8:
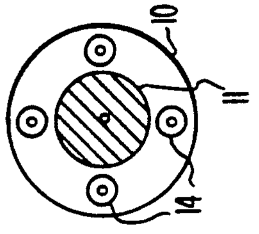
FIG. 8 is an elevation taken along line 8—8 of FIG. 7.

As shown in FIG. 7, one embodiment of the probe comprises a probe body 10 having a rear support 11 for holding the probe in the furnace enclosure, and for receiving an optical fiber 12 that enters the probe body. Four optical fiber plus air ports 14 are distributed around the support 11 for detecting reflected radiation such as the sodium or potassium lines of visible light or infrared radiation. Four similar optical fiber plus air ports 16 are provided in the outer face of the housing 10 for measuring incident radiation.

Figure 12:
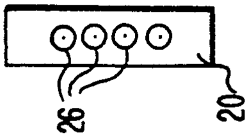
FIG. 12 is an elevation taken along line 12—12 of FIG. 10.
Figure 10:
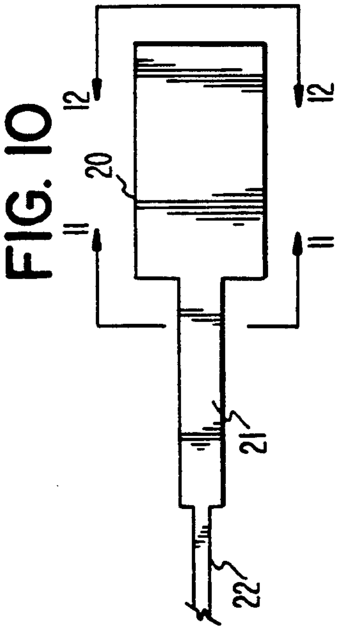
FIG. 10 is a view similar to FIG. 7 of another embodiment of the probe.
Figure 11:
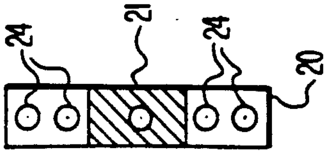
FIG. 11 is an elevation taken along line 11—11 of FIG. 10.

FIG. 10 shows an alternate embodiment of the probe having a rectangular probe body 20 with rectangular support 21 which receives optical fiber 22. As shown in FIG. 11, four rearwardly facing ports 24 are provided for reflected radiation and as shown in FIG. 12, four forwardly facing ports 26 are provided for incident radiation.

The infrared monitor of U.S. Pat. No. 4,539,588 may also be used to measure wall reflectivity or temperature.

Spectral emissivity of a deposit is defined as the ratio of the intensity of radiation emitted by the surface of the deposit to the intensity of radiation emitted by a blackbody (a perfect emitter), with both at the same temperature. Total emissivity, as opposed to spectral emissivity is the integration of the spectral emissivity over all wavelengths.

While a specific embodiment of the invention has been shown and described in detail to illustrate the application of the principles of the invention, it will be understood that the invention may be embodied otherwise without departing from such principles.

What is claimed is:

1. A method for controlling the operation of a water lance for cleaning a furnace wall having a changing emissivity, comprising the steps of:

calculating the furnace wall emissivity;

comparing the calculated emissivity with a programmed low setpoint for minimum emissivity of the furnace wall which represents an unclean condition for the furnace wall; and initiating water lance operation when the calculated emissivity drops below the programmed low setpoint, to clean the furnace wall.

2. A method according to claim 1 further including the steps of:

terminating the water lance operation;

calculating the furnace wall emissivity at termination of the water lance operation to establish a peak emissivity indicating a clean condition;

repeating the initiation and termination of water lance operation to calculate additional peak emissivities; and comparing at least two peak emissivities and depending on differences between the at least two peak emissivities, adjusting a speed at which the water lance operation is conducted.

3. A method according to claim 2 including taking the algebraic difference between adjacent peaks in emissivity to adjust the speed at which water lance operation takes place.

4. A method according to claim 1 including programming a high setpoint representing a peak emissivity, and regulating a speed at which the water lance operation is conducted, as a function of the high setpoint.

5. A method according to claim 4 including establishing a programmed to maximum setpoint for the speed of water lance operation, comparing the actual water lance operation speed with the maximum speed setpoint and if the water lance operation speed exceeds the setpoint speed, activating an alarm.

6. A method for controlling the operation of at least one water lance for cleaning a furnace wall, comprising the steps of:

measuring a furnace wall parameter;

comparing the measured parameter with a programmed setpoint for that parameter of the furnace wall which represents an unclean condition for the furnace wall; and initiating the at least one water lance operation when the measured parameter indicates the unclean condition for the furnace wall to clean the furnace wall.

7. A method according to claim 6, further comprising the steps of:

terminating the water lance operation;

measuring the furnace wall parameter at termination of the water lance operation to establish a setpoint indicating a clean condition;

repeating the initiation and termination of water lance operation to calculate additional setpoints; and comparing at least two setpoints and depending on differences between the at least two setpoints, adjusting a speed at which the water lance operation is conducted.

8. A method according to claim 7, further comprising the step of taking the algebraic difference between adjacent setpoints to adjust the speed at which water lance operation takes place.

9. A method according to claim 6, further comprising the step of programming a setpoint representing a clean condition for the furnace wall, and regulating a speed at which the water lance operation is conducted, as a function of the clean condition setpoint.

10. A method according to claim 6, further comprising the steps of establishing a programmed to maximum setpoint for the speed of water lance operation, comparing the actual water lance operation speed with the maximum speed setpoint and if the water lance operation speed exceeds the setpoint speed, activating an alarm.

11. A method according to claim 6, wherein the furnace wall parameter comprises temperature.

12. A method according to claim 6, wherein the furnace wall parameter comprises reflectivity.

13. An apparatus for controlling the operation of a water lance for water cleaning a furnace wall having a changing emissivity, comprising:

means for calculating the furnace wall emissivity;

means for comparing the calculated emissivity with a programmed low setpoint for the emissivity; and means for initiating water lance operation when the calculated emissivity drops below the programmed low setpoint, to clean the furnace wall.

14. An apparatus according to claim 13, wherein the means for calculating comprises a radiation sensor for sensing emissivity of the furnace wall.

15. An apparatus according to claim 13, including means for adjusting a speed at which the water lance operation takes place, and means for controlling the speed according to peak furnace wall emissivity following each completion of a water lance cleaning operation.

16. An apparatus for controlling the operation of at least one water lance for water cleaning a furnace wall, comprising:

means for measuring a furnace wall parameter;

means for comparing the measured parameter with a programmed setpoint representative of an unclean condition; and means for initiating the at least one water lance operation when the measured parameter indicates an unclean condition to clean the furnace wall.

17. An apparatus according to claim 16 wherein the measuring means comprises a sensing probe for measuring reflectivity of the furnace wall.

18. An apparatus according to claim 16 including means for adjusting a speed at which the at least one water lance operation takes place, and means for controlling the speed according to setpoints following each completion of a water lance cleaning operation.

19. An apparatus according to claim 16 wherein the measuring means comprises an infrared monitor for measuring temperature of the furnace wall.

20. An apparatus according to claim 16 wherein the measuring means comprises an infrared monitor for measuring wall reflectivity.

* * * * *